Nov. 8, 1932.  E. D. KOHR  1,887,311
PUMP
Filed Feb. 9, 1931   3 Sheets-Sheet 1

INVENTOR.
Elton D. Kohr
BY
Geo. P. Kimmel
ATTORNEY.

Nov. 8, 1932.  E. D. KOHR  1,887,311
PUMP
Filed Feb. 9, 1931    3 Sheets-Sheet 2
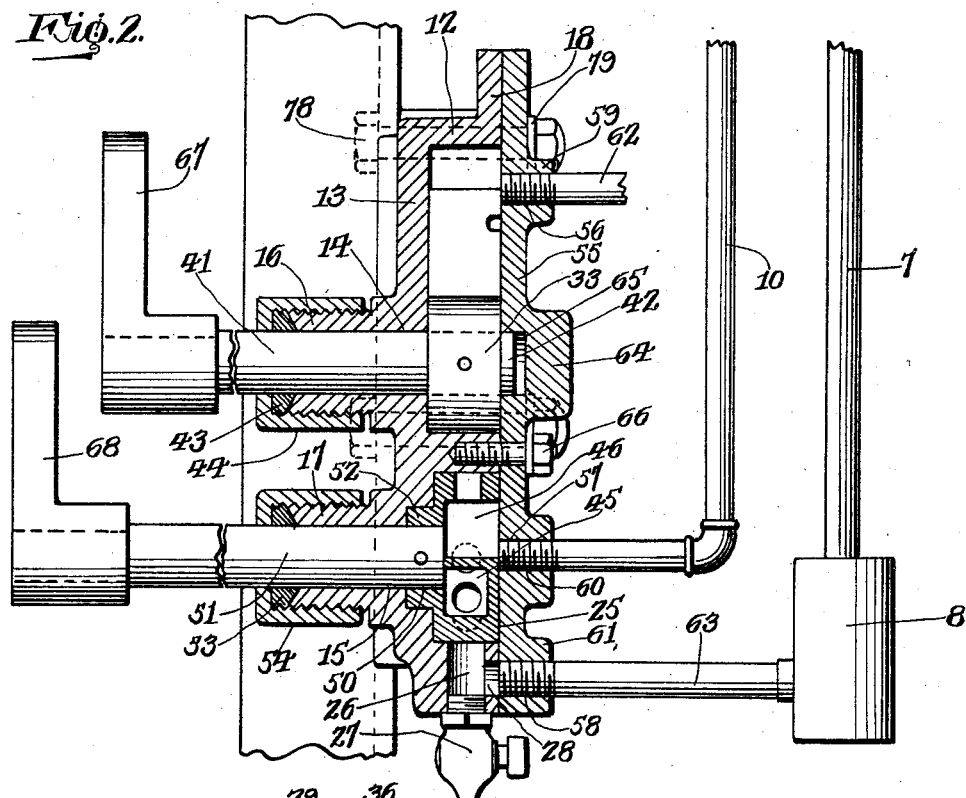
Fig. 2.
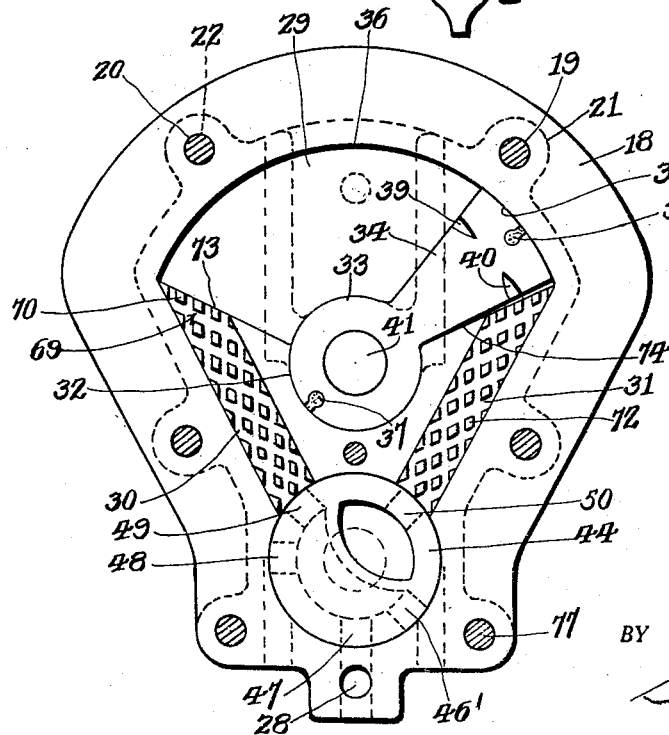
Fig. 3.
Fig. 6.
INVENTOR.
Elton D. Kohr
BY
Geo. P. Kimmel
ATTORNEY.

Nov. 8, 1932.  E. D. KOHR  1,887,311
PUMP
Filed Feb. 9, 1931  3 Sheets-Sheet 3
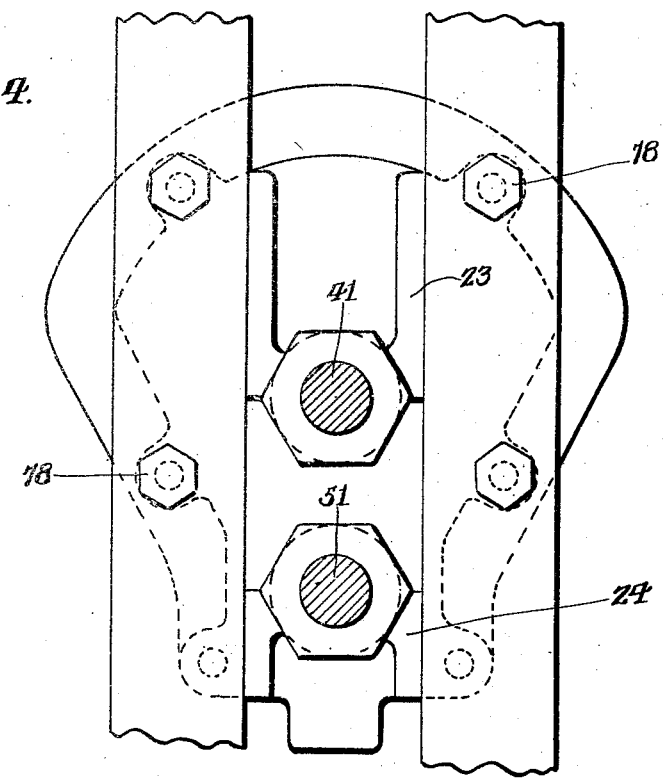
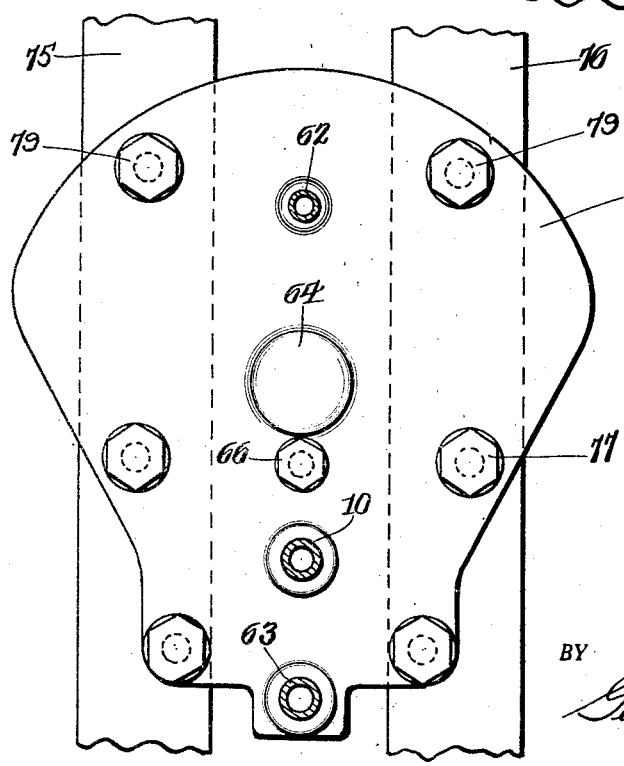
INVENTOR.
Elton D. Kohr
BY
Geo. P. Kimmel
ATTORNEY.

Patented Nov. 8, 1932

1,887,311

UNITED STATES PATENT OFFICE

ELTON D. KOHR, OF YORK, PENNSYLVANIA

PUMP

Application filed February 9, 1931. Serial No. 514,632.

This invention relates to a pump designed primarily for use in connection with machines for manufacturing a frozen edible, such as custards, ice creams and ices, but it is to be understood that a pump in accordance with this invention may be employed in any connection for which it may be found applicable, and the invention has for its object to provide, in a manner as hereinafter set forth, a pump for supplying a product forming liquid to the freezing unit of the machine and placing it under pressure to break up the liquid thereby resulting in a smooth product.

A further object of the invention is to provide, in a manner as hereinafter set forth, a pump for use in connection with the type of machine referred to including means for supplying a product forming liquid in the presence of compressed air to the freezer unit of the machine and with the pump including means for breaking up globules in the liquid which results in a smooth product and obtains a greater swell.

A further object of the invention is to provide, in a manner as hereinafter set forth, a pump including means for supplying simultaneously a product forming liquid combined with air and under pressure to the freezer unit of a machine for manufacturing a frozen edible, and with the pump including a breaker means for the globules of the liquid and with the breaker means acting on the intake of the liquid to the pump and on the discharge of the liquid and air from the pump.

A further object of the invention is to provide, in a manner as hereinafter set forth, a liquid supply element for a machine for manufacturing a frozen edible and with such means acting as a suction and pressure pump, a harmonizer and for combining air with the liquid resulting in a smooth and tasty product.

A further object of the invention is to provide, in a manner as hereinafter set forth, a pump including an open front housing, a closure plate therefor and means common to the housing and plate for fixedly securing them together and for anchoring the pump fixedly to a support.

Further objects of the invention are to provide, in a manner as hereinafter set forth, a pump for the purpose referred to which is comparatively simple in its construction and arrangement, strong, durable, compact, thoroughly efficient in its use, readily installed with respect to a machine with which it is to be employed, and comparatively inexpensive to manufacture.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 2 is a vertical sectional view of the pump.

Figure 3 is a front view of the pump with the closure plate for the pump housing removed and further illustrating in dot and dash lines the relative position of the compressed air intake with respect to the liquid receiving chamber for the pump.

Figure 4 is a rear elevation of the pump anchored to a supporting frame therefor.

Figure 5 is a front elevation of the pump anchored to the supporting frame therefor.

Figure 6 is a side elevation of a breaker element.

Figure 1:
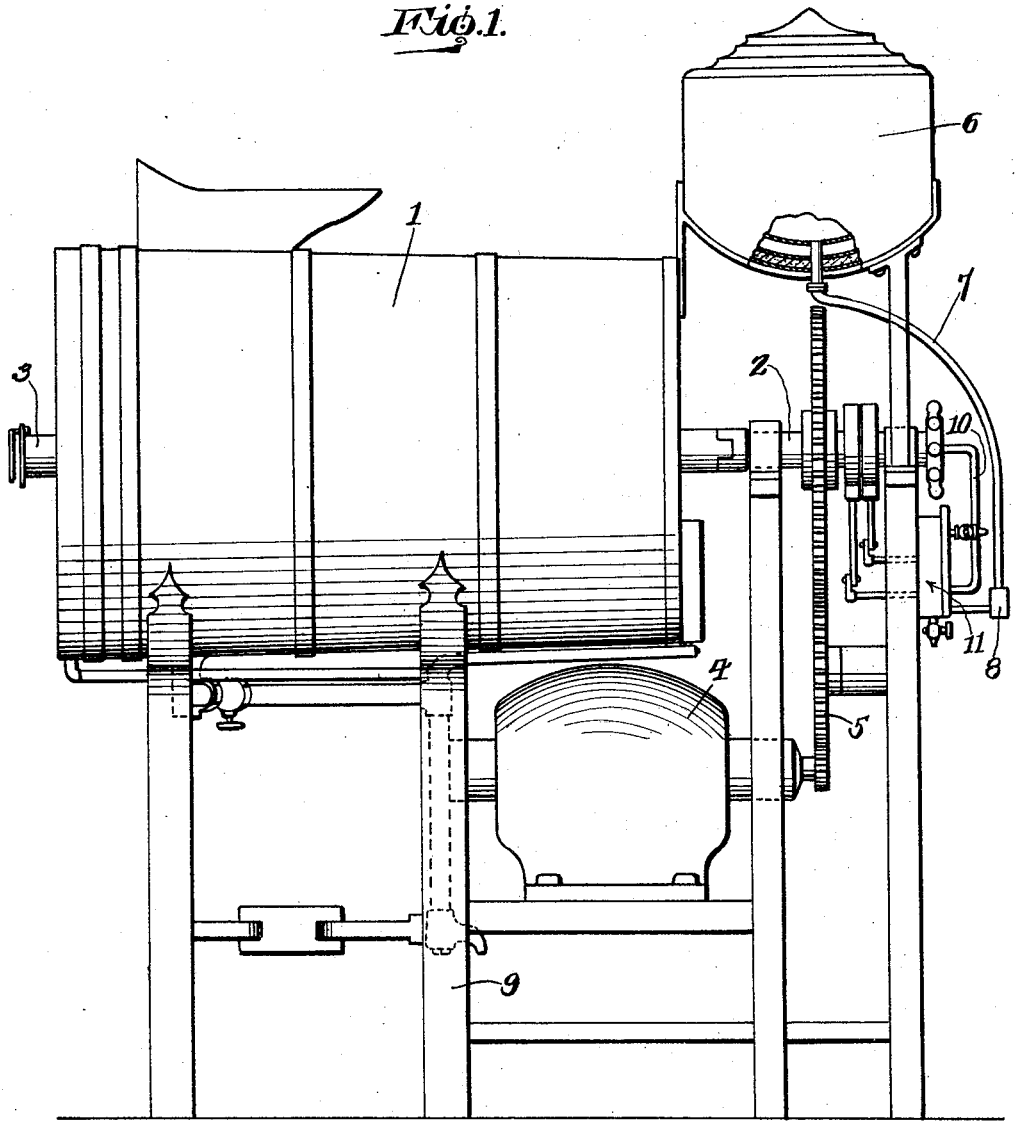
Figure 1 is a side elevation, broken away, of a machine for manufacturing a frozen edible, showing the adaptation therewith of a pump in accordance with this invention for supplying the material and air to the machine.

A pump, in accordance with this invention is illustrated by way of example as installed with respect to a well known type of machine for manufacturing a frozen edible, such as custards, ice creams and ices. The machine will be briefly referred to and it includes a refrigerant container 1 having suspended therein a rotatable freezer unit, not shown, a rotating means 2 for the freezer unit, a discharge spout 3 which leads from the freezer unit and projects from the front end of the container 1, a motor 4, a driving connection 5 between the motor and the means 2, a liquid supply or storage container 6, a liquid conducting line 7 leading therefrom to an auxiliary liquid supply container 8, and a supporting frame 9 for the container 1, motor 4 and container 6. The liquid and air is conducted through the means 2 into the freezer unit and is supplied for passage through said means 2 by a discharge pipe 10 which leads from a pump 11, in accordance with this invention and opens into the means 2 at the outer end thereof.

The pump 11 includes a vertically disposed housing 12 open at its front and closed at its back. The back 13 of the housing 12 is provided at its vertical median with a pair of superposed spaced openings 14, 15. Extending rearwardly from the back 13 is a pair of peripherally threaded tubular bearings 16, 17 which register respectively with the openings 14, 15. The housing 12 at its front is formed with a laterally disposed endless flange 18 which conforms in contour to that of the housing. The flange 18 at one side is provided with a set of spaced openings 19 and at its other side with a set of spaced openings 20. The housing 12 at one side as formed integral therewith a set of laterally extending tubular bosses 21 registering with the openings 19 and at its other side with a set of integral laterally extending tubular bosses 22 which register with the openings 20. The back 13 has formed integral therewith and projecting rearwardly therefrom a pair of superposed positioning reinforcing webs 23, 24 the former terminating at its lower end in the sleeve 16 and the latter at its upper end into the sleeve 17.

The lower portion of the housing 12, centrally thereof is formed with a valve chamber 25 having opening into the bottom thereof a vertically disposed port 26 arranged at the vertical median of the housing 12 and terminating at the bottom edge of the latter. The lower end of port 26 is closed by a drain cock 27 which depends from housing 12. Communicating with the port 26, formed in the bottom of housing 12 and directed forwardly and at right angles to port 26 is an opening 28.

Formed in the housing 12, a substantial distance above the valve chamber 25 is a liquid and air receiving chamber 29 substantially of segmental contour having an arcuate top wall and its bottom wall formed centrally with a pocket 32 of a contour greater than a half circle and further formed with oppositely inclined wall portions 73, 74. The pocket 32 communicates with the opening 14. Extending from the chamber 25 to the chamber 29 and through the wall portions 73, 74 is a pair of oppositely inclined channels 30, 31 respectively and each of which is for intake and discharge to and from chamber 29. The wall of pocket 32 provides a bearing surface. Positioned within the pocket 32 and extending therefrom into chamber 29 is the annular head 33 of the body portion of a combined suction and discharge element 34. The body portion of such element has a curved outer edge and gradually increases in width from the head 33 to its outer end edge. The curved outer end edge of element 34 is indicated at 35 and the upper wall of chamber 29 at 36. The head 33 carries a packing 37 which rides against the wall of pocket 32. The element 34 carries a packing 38 which rides against wall 36. The front face of element 34 is provided with a pair of oppositely extending spaced grooves 39, 40 which gradually decrease in depth from their inner ends to the side edges of element 34. The combined suction and discharge element 34 is of the oscillating type and the means for operating it will be presently referred to. The head 33 of element 34 is fixed to a shaft 41 which extends slightly forward of head 33, as at 42. The shaft 41 extends through opening 14 and sleeve 16 and projects a substantial distance rearwardly from the sleeve. Surrounding shaft 41 is a packing 43 which is maintained in position by a cap 44 having threaded engagement with the sleeve 16.

Arranged within the chamber 25 is an oscillatory controlling valve for intake and discharge from chamber 29. The valve is indicated at 44 and is of circular contour. The valve 44 is formed with a closed intake chamber 45 and an outlet chamber 46 open at its outer side. Communicating with the chamber 45 are spaced ports 46', 47, 48 and 49. Opening into the chamber 46 is a port 50. The ports 46' and 49 are adapted to alternately communicate with the channels 30, 31 and the ports 47, 48 are adapted to alternately communicate with the port 26. The rear of the valve 44 is formed with an opening 50 into which extends a valve stem 51, the latter being fixedly secured to valve 44. The rear of valve 44 has a collar 52 which encompasses the stem 51. The stem 51 projects rearwardly from the valve 44, through opening 15 and bearing sleeve 17 and projects rearwardly a substantial distance from sleeve 17. Surrounding the stem 51 is a packing 53 which is secured in position by a cap 54 having threaded engagement with the sleeve 17.

The open front of the housing 12 is closed by a front plate 55 which conforms in contour to that of the flange 18. The plate 55 is provided with openings corresponding in number to the number of the openings of the sets 19 and 20 in flange 18. The openings in plate 55 register with the openings in flange 18. The plate 55 is also provided with a series of superposed spaced openings 56, 57 and 58 and a series of outwardly projecting spaced collars 59, 60 and 61 which register with the openings 56, 57 and 58 respectively, and the walls of said openings and collars are threaded. Secured to the walls of the opening 56 and collar 59 is a valve controlled compressed air supply pipe 62 which opens into the chamber 29. Secured to the walls of opening 57 and collar 60 is the supply pipe 10, and the latter opens into chamber 46. Secured to the walls of the opening 58 and collar 61 is a liquid feed pipe 63 which leads from the auxiliary container 8 and communicates with the opening 28. The plate 55 is enlarged on its front as at 64 which forms a pocket 65 into which extends the forward end 42 of shaft 41 and the wall of pocket 65 provides a bearing for the portion 42 of shaft 41. Extending through plate 55 and engaging in housing 12, directly below the enlargement 64 is a holdfast device 66.

The operating means for the shaft 41 and stem 51 is driven from the means 2 and it consists of a pair of cranks 67, 68 the former being connected to the rear end of shaft 41 and the latter being connected to the rear end of the stem 51. The crank 67 provides for rocking or oscillating the shaft 41 which in turn will oscillate the element 34. The crank 68 provides for oscillating the stem 51 which in turn will oscillate the valve 44.

Positioned within channel 30 and extending from chamber 25 to chamber 29 is a breaker element 69 for the globules of the liquid as the latter passes to and is discharged from chamber 29. The element 69 consists of a group of spaced knife edged tines 70 carried by a base 71. Positioned within channel 31 is a breaker element 72 extending from chamber 25 to chamber 29 and constructed in the same manner as breaker element 69 and performing a like function on the material when the latter is supplied to and discharged from the chamber 29.

When the element 34 moves to the right it sucks the liquid into the chamber 29 through channel 30 and discharges the liquid from chamber 29 through channel 31 and when element 34 moves to the left it sucks the material into the chamber 29 through channel 31 and discharges the liquid from chamber 29 through channel 30.

The operation of the valve 44 by the cranks 67, 68 is such that when element 34 is travelling to the right, that is to say from wall 73 to wall 74 of chamber 29, the port 49 will register with channel 30, the port 50 with channel 31, the port 47 with port 26 and the ports 46′ and 48 closed. This will provide for intake of liquid to the left and discharge of liquid from the right of chamber 29. When element 34 is travelling to the left, that is to say from wall 74 to wall 73 of chamber 29, the port 46′ will register with channel 31, port 50 with channel 30 and port 48 with port 26. This will provide for intake of liquid to the right and discharge of liquid from the left of chamber 29. When port 48 is registering with port 26 ports 47 and 49 will be closed. The chamber 46 is common to channels 30 and 31 for discharge. The element 34 provides for intermittently opening the air supply pipe 62 to chamber 29, that is to say it intermittently opens and closes pipe 62 on the intake of liquid to the left of chamber 29 and it intermittently opens and closes pipe 62 on the intake of liquid to the right of chamber 29. The intake of air from pipe 62 is had just before the element 34 passes to the left or to the right by the grooves 39, 40. The closing of pipe 62 to the right or to the left of chamber 29 is had after a side edge of element 34 passes the opening 56 and which is provided for by the grooves 39 and 40. The element 34 not only functions for drawing the liquid into the chamber 29, but for discharging it therefrom and further normally controls the supply of air with respect to the stretches of liquid on the intake and discharge of the latter.

The frame 9 includes a pair of uprights 75, 76 of angle shaped cross section and against which the housing is positioned. The webs 23 and 24 are arranged between and abut opposed flanges of said uprights. Extending through the other flanges of said uprights are bolts 77 having their heads 78 abutting the rear faces of such flanges. The bolts extend through the bosses 22, 21, openings 19, 20 and openings in the plate 55. The bolts project a substantial distance from the plate 55 and carry cap nuts 79. By this arrangement, the cap nuts 79 can be removed from the bolts and the pump, after the cranks 67, 68 are disconnected from the shaft 41 and stem 51 respectively as an entirety can be slid off the bolts. This arrangement also provides for the removal of the front plate 55 without removing the pump from the uprights. The manner of setting up the pump with respect to the uprights fixedly secures it in position. The manner of setting up the bolts with respect to the uprights enables the latter to be expeditiously secured in position with respect to the uprights when desired.

What I claim is:—

1. A pump comprising a receiving chamber for liquid and air and having an air intake, said chamber including an arcuate top wall, a bottom wall, a front wall and a rear wall, said air intake being in said front wall, a pair of channels opening into said chamber through said bottom wall and each providing alternately a liquid inlet and a combined air and liquid outlet, an oscillatory combined suction and discharge element within said chamber for alternately drawing into opposite sides of the chamber air through said intake and liquid through said channels and for alternately discharging from opposite sides of said chamber a body of air and liquid through said channels, said element including a body part travelling against said top wall, and an oscillatory valve for alternately controlling the intake of liquid to opposite sides of said chamber and for alternately controlling the discharge from opposite sides of said chamber of a body of air and liquid.

2. A pump comprising a receiving chamber for liquid and air and having an air intake, said chamber including an arcuate top wall, a bottom wall, a front wall and a rear wall, said air intake being in said front wall, a pair of channels opening into said chamber through said bottom wall and each providing alternately a liquid inlet and a combined air and liquid outlet, an oscillatory combined suction and discharge element within said chamber for alternately drawing into opposite sides of the chamber air through said intake and liquid through channels and for alternately discharging from opposite sides of said chamber a body of air and liquid through said channels, said element including a body part travelling against said top wall, an oscillatory valve for alternately controlling the intake of liquid to opposite sides of said chamber and for alternately controlling the discharge from opposite sides of said chamber of a body of air and liquid, and a breaker element of comb like form corresponding to the length of and extending lengthwise of each of said channels.

3. A pump comprising a housing providing a receiving chamber for air and liquid and an air intake for said chamber, said chamber including an arcuate top wall, a bottom wall, a front wall and a rear wall, said air intake being in said front wall, said housing further providing a valve chamber spaced from said receiving chamber, an air and liquid discharge outlet leading from the valve chamber, a liquid inlet leading to the latter and a pair of channels leading from the valve chamber through said bottom wall to the receiving chamber, each of said channels providing alternately a liquid inlet for the receiving chamber and a combined air and liquid outlet for the receiving chamber, an oscillatory combined suction and discharge element in said receiving chamber for alternately drawing into opposite sides of the chamber air and liquid and for alternately discharging from opposite sides of the receiving chamber a body of air and liquid, and an oscillatory valve within said valve chamber for controlling the intake of liquid alternately through opposite sides of said receiving chamber and for controlling discharge from opposite sides of said receiving chamber of a body of air and liquid.

4. A pump comprising a housing providing a receiving chamber for air and liquid and an air intake for said chamber, said chamber including an arcuate top wall, a bottom wall, a front wall and a rear wall, said air intake being in said front wall, said housing further providing a valve chamber spaced from said receiving chamber, an air and liquid discharge outlet leading from the valve chamber, a liquid inlet leading to the latter and a pair of channels leading from the valve chamber through said bottom wall to the receiving chamber, each of said channels providing alternately a liquid inlet for the receiving chamber and a combined air and liquid outlet for the receiving chamber, an oscillatory combined suction and discharge element in said receiving chamber for alternately drawing into opposite sides of the chamber air and liquid and for alternately discharging from opposite sides of the receiving chamber a body of air and liquid, an oscillatory valve within said valve chamber for controlling the intake of liquid alternately through opposite sides of said receiving chamber and for controlling discharge from opposite sides of said receiving chamber of a body of air and liquid, and a breaker element of comb-like form corresponding to the length of and arranged in each of said channels.

5. A pump including an air and liquid receiving chamber, an air inlet opening into said chamber at the front of the latter, channels opening into said chamber through the bottom of the latter, an oscillatory element for alternately drawing in liquid through said channels into opposite sides of the chamber and for alternately discharging air and liquid from opposite sides of the chamber, an oscillatory valve for controlling the supply of liquid to said chamber and for controlling the discharge of liquid and air from said chamber, a liquid inlet, a combined air and liquid discharge outlet, said valve being ported and having a liquid receiving chamber for communication with said liquid inlet and for alternate communication with said channels, said valve further having a liquid and air receiving chamber for permanent communication with said combined air and liquid discharge outlet and for alternate communication with said channels.

6. A pump including an air and liquid receiving chamber, an air inlet opening into said chamber at the front of the latter, channels opening into said chamber through the bottom of the latter, an oscillatory element for alternately drawing in liquid through said channels into opposite sides of the chamber and for alternately discharging air and liquid from opposite sides of the chamber, an oscillatory valve for controlling the supply of liquid to said chamber and for controlling the discharge of liquid and air from said chamber, a liquid inlet, a combined air and liquid discharge outlet, said valve being ported and having a liquid receiving chamber for communication with said liquid inlet and for alternate communication with said channels, said valve further having a liquid and air receiving chamber for permanent communication with said combined air and liquid discharge outlet and for alternate communication with said channels, and a breaker element mounted in each of said channels.

7. A pump comprising a housing formed with an air and liquid receiving chamber of segmental contour, a circular valve chamber arranged below and spaced from the receiving chamber, a pocket opening into the receiving chamber centrally of the bottom thereof, a pair of channels leading from the valve chamber to the receiving chamber each functioning alternately as a liquid intake to and a combined air and liquid outlet from said receiving chamber, a liquid intake for the valve chamber, a combined air and liquid outlet for the valve chamber and an air intake for the receiving chamber, an oscillatory element seated in said pocket and operating in said chamber for alternately drawing into opposite sides of said receiving chamber air and liquid and for alternately discharging air and liquid from opposite sides of the receiving chamber, and an oscillatory chambered and ported controlling valve mounted in the receiving chamber.

8. A pump comprising a housing formed with an air and liquid receiving chamber of segmental contour, a circular valve chamber arranged below and spaced from the receiving chamber, a pocket opening into the receiving chamber centrally of the bottom thereof, a pair of channels leading from the valve chamber to the receiving chamber each functioning alternately as a liquid intake to and a combined air and liquid outlet from said receiving chamber, a liquid intake for the valve chamber, a combined air and liquid outlet for the valve chamber and an air intake for the receiving chamber, an oscillatory element seated in said pocket and operating in said chamber for alternately drawing into opposite sides of said receiving chamber air and liquid and for alternately discharging air and liquid from opposite sides of the receiving chamber, an oscillatory chambered and ported controlling valve mounted in the valve chamber, and a breaker element disposed throughout the length of each channel and of comb-like form.

9. A pump including an air and liquid receiving chamber, an air inlet opening into said chamber at the front of the latter, channels opening into said chamber through the bottom of the latter, an oscillatory element for alternately drawing in air through said intake and liquid through said channels into opposite sides of the chamber and for alternately discharging the air and liquid from opposite sides of the chamber, said element travelling across and against the top of said chamber, and an oscillatory valve for controlling the supply of liquid into said chamber and the discharge of air and liquid from said chamber.

10. A pump including an air and liquid receiving chamber, an air inlet opening into said chamber at the front of the latter, channels opening into said chamber through the bottom of the latter, an oscillatory element for alternately drawing in air through said intake and liquid through said channels into opposite sides of the chamber and for alternately discharging the air and liquid from opposite sides of the chamber, said element travelling across and against the top of said chamber, an oscillatory valve for controlling the supply of liquid into said chamber and the discharge of air and liquid from said chamber, and a breaker element arranged in each of said channels, corresponding in length to that of the channel in which it is mounted and being of comb-like form.

In testimony whereof, I affix my signature hereto.

ELTON D. KOHR.